Figure 5:
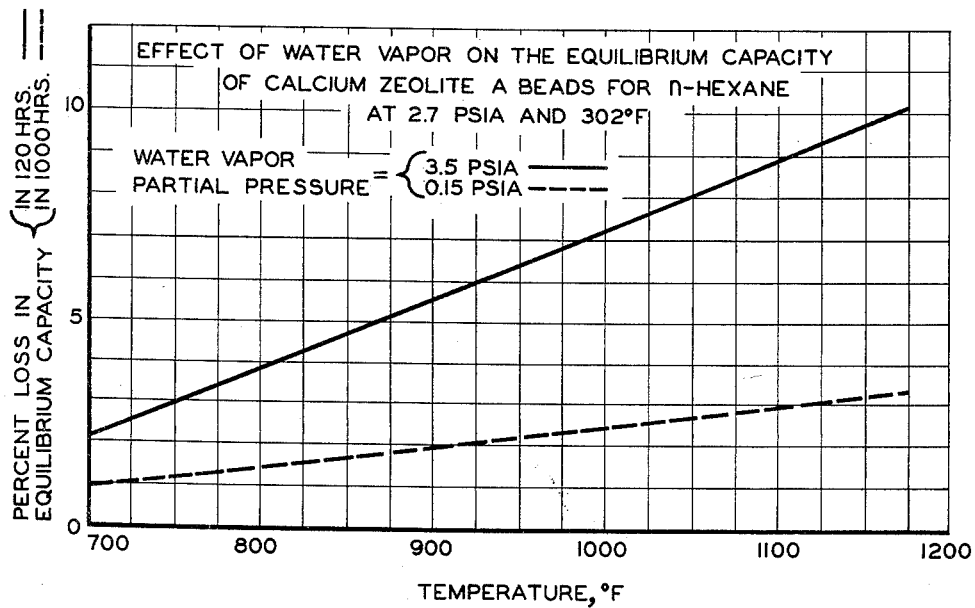

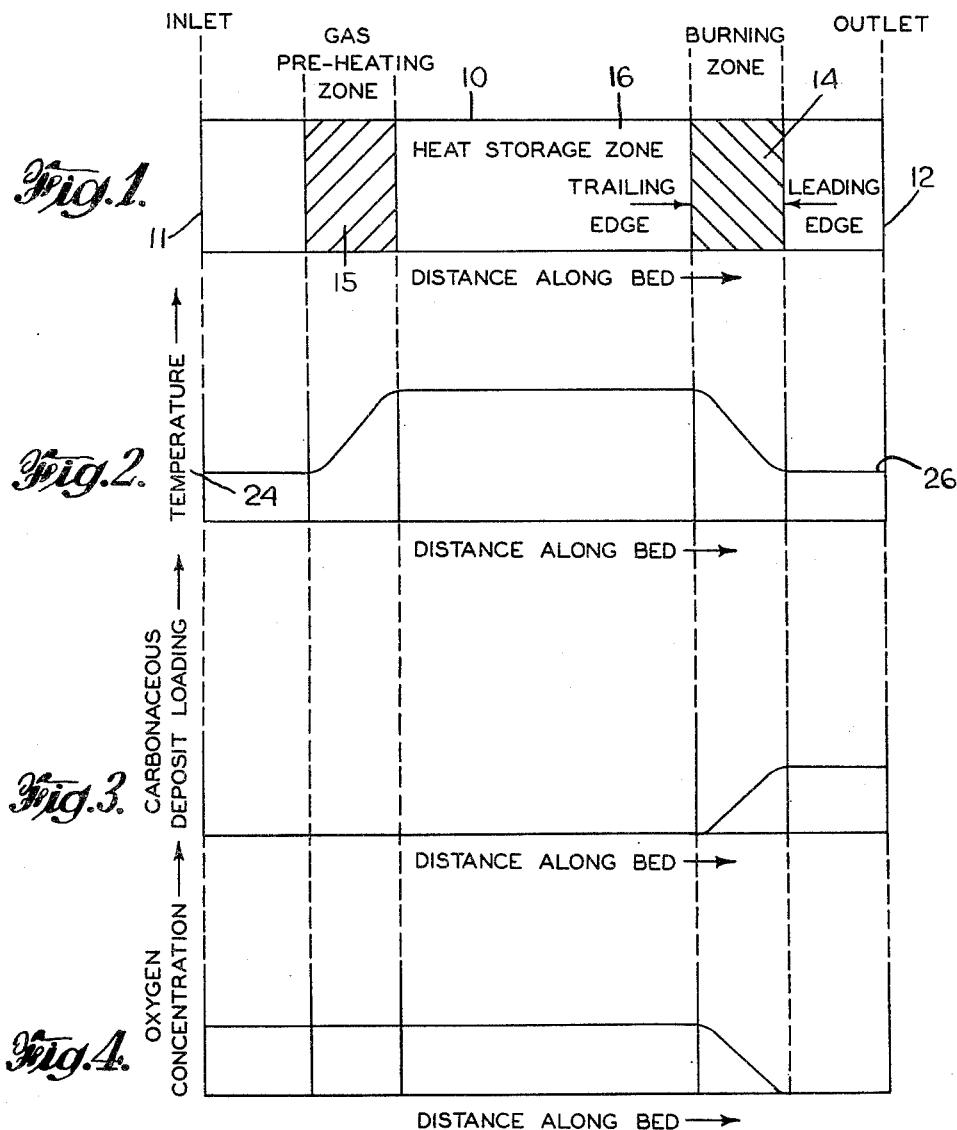

Dec. 18, 1962  R. L. MAYS ETAL  3,069,363
REACTIVATION OF MOLECULAR SIEVES
Filed May 4, 1960  2 Sheets-Sheet 2

INVENTORS
ROLLAND L. MAYS
HARRISON B. RHODES
FRED W. LEAVITT

BY William F. Mesinger
ATTORNEYS

United States Patent Office 3,069,363
Patented Dec. 18, 1962

3,069,363
REACTIVATION OF MOLECULAR SIEVES
Rolland L. Mays, Williamsville, and Harrison B. Rhodes and Fred W. Leavitt, Buffalo, N.Y., assignors to Union Carbide Corporation, a corporation of New York
Filed May 4, 1960, Ser. No. 26,822
11 Claims. (Cl. 252—419)

This invention relates to a method for reactivating crystalline zeolitic molecular sieves. More particularly, the invention relates to a process for removing carbonaceous deposits from crystalline zeolitic molecular sieves by means of controlled oxygene burnoff.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example alkali metal and alkaline earth metal ions such as sodium, potassium, calcium and magnesium ions.

The crystal structure of such zeolites also exhibit interstices of molecular dimensions. The interstitial spaces are generally occupied by water of hydration. Under proper conditions, for example after at least partial dehydration, these zeolites may be utilized as efficient adsorbents whereby adsorbate molecules are retained within the interstitial spaces. Acess to these channels is had by way of orifices in the crystal lattice. The openings limit the size and shape of the molecules that can be adsorbed. A separation of mixtures of foreign molecules based upon molecular dimensions, wherein certain molecules are adsorbed by the zeolite while others are excluded, is therefore possible. It is this characteristic property of many crystalline zeolites that has led to their designation as "molecular sieves."

Many synthetic and naturally occurring crystalline zeolites are known. They are distinguishable from each other on the basis of their composition, crystal structure and adsorption properties. A particularly suitable method for distinguishing these compounds is by their X-ray powder diffraction patterns. The existence of a number of zeolites having similar but distinguishable properties advantageously permits the selection of a particular member having optimum properties for a particular use.

Unlike common adsorbents, such as charcoal and silica gel, which show adsorption selectivities based primarily on the boiling point or critical temperature of the adsorbate, crystalline zeolitic molecular sieves exhibit a selectivity based on the size, degree of unsaturation, shape, polarity and polarizability of the adsorbate molecule. Among these adsorbate molecules whose size and shape are such as to permit adsorption by the zeolite, a strong preference is exhibited toward those that are polar, polarizable and unsaturated. This adsorption selectivity renders molecular sieves most useful in the separation of polar from less polar or nonpolar molecules; of polarizable from less polarizable or nonpolarizable molecules; of unsaturated hydrocarbon molecules from corresponding less unsaturated or saturated molecules; and of straight-chained aliphatic hydrocarbon molecules from branch-chained aliphatic, cycloaliphatic and aromatic hydrocarbon molecules.

It is to be noted that the rejection characteristics of crystalline zeolitic molecular sieves are as important as the adsorption characteristics. For example, the interstitial channels of calcium zeolite A are such that at their narrowest points molecules with critical dimensions greater than approximately 5 angstrom units will not readily enter into the channels. The term "critical dimension" as employed herein may be defined as the maximum dimension of the minimum projected cross-section of the adsorbate molecule. The term may also be defined as the diameter of the smallest cylinder which will accommodate a model of the adsorbate molecule using the best available values of bond distances, bond angles and Van der Waals' radii. Hence, molecules having critical dimensions greater than approximately 5 angstrom units will be rejected by calcium zeolite A, while those having smaller critical dimensions will be adsorbed.

The zeolites occur as agglomerates of fine crystals or are synthesized as fine powders and are preferably tableted or pelletized for large scale adsorption uses. Pelletizing methods are known which are very satisfactory because the adsorptive character of the zeolite, both with regard to selectivity and capacity, remains essentially unchanged.

Examples of crystalline zeolitic molecular sieves which may be reactivated by the process of the present invention are the following:

Zeolite A is a crystalline zeolitic molecular sieve which may be represented by the formula $$1.0 \pm 0.2 M_{2/n} O:Al_2O_3:1.85 \pm 0.5 SiO_2:yH_2O$$

wherein M represents a metal, n is the valence of M, and y may have any value up to about 6. The as-synthesized zeolite A contains primarily sodium ions and is designated sodium zeolite A. Calcium zeolite A is a derivative of sodium zeolite A in which about 35 percent or more of the exchangeable sodium cations have been replaced by calcium. Similarly, strontium zeolite A and magnesium zeolite A are derivatives of sodium zeolite A wherein about 35 percent or more of the exchangeable sodium ions have been replaced by the strontium or magnesium ions. Zeolite A is described in more detail in U.S. Patent No. 2,882,243 issued April 14, 1959.

Zeolite D is a crystalline zeolitic molecular sieve which is synthesized from an aqueous aluminosilicate solution containing a mixture of both sodium and potassium cations. In the as-synthesized state, zeolite D has the chemical formula:

$$0.9 \pm 0.2[xNa_2O:(1-x)K_2O]:Al_2O_3:wSiO_2:yH_2O$$

wherein "x" is a value from zero to 1, "w" is from about 4.5 to 4.9 and "y" in the fully hydrated form is about 7. Further characterization of zeolite D by means of X-ray diffraction techniques is described in copending application Serial No. 680,383, filed August 26, 1957. The preparative conditions for zeolite D and its ion-exchanged derivatives and their molecular sieving properties are also described therein.

Zeolite T is a synthetic crystalline zeolitic molecular sieve whose composition may be expressed in terms of oxide mole ratios, as follows:

$$1.1 \pm .4[xNa_2O:(1-x)K_2O]:Al_2O_3:6.9 \pm 0.5SiO_2:yH_2O$$

wherein "x" is any value from about 0.1 to about 0.8 and "y" is any value from about zero to about 8. Further characterization of zeolite T by means of X-ray diffraction techniques is described in copending application Serial No. 733,819, filed May 8, 1958 now U.S. Patent No. 2,950,952.

Zeolite X is a synthetic crystalline zeolitic molecular sieve which may be represented by the formula:

$$0.9 \pm 0.2\frac{M_2}{n}O:Al_2O_3:2.5 \pm 0.5SiO_2:yH_2O$$

wherein M represents a metal, particularly alkali and alkaline earth metals, $n$ is the valence of M, and $y$ may have any value up to about 8, depending on the identity of M and the degree of hydration of the crystalline zeolite. Zeolite X, its X-ray diffraction pattern, its properties, and methods for its preparation are described in detail in U.S. Patent No. 2,882,244 issued April 14, 1959.

Erionite is a naturally occurring crystalline zeolitic molecular sieve, described originally by Eakle, Am. J. Science (4), 6, 66 (1898). It is most readily identified by its characteristic X-ray powder diffraction pattern. The $d$-spacings, in A., and relative intensities thereof, obtained on a well-crystallized specimen are tabulated below.

X-RAY POWDER DATA, ERIONITE

| $d$-Spacing, A | Relative intensity $I/I_0 \times 100$ | $d$-Spacing, A | Relative intensity $I/I_0 \times 100$ |
|---|---|---|---|
| 11.38 | 100 | 3.14 | 10 |
| 9.06 | 10 | 3.00 | 5 |
| 7.50 | 10 | 2.92 | 5 |
| 6.56 | 40 | 2.86 | 30 |
| 6.24 | 10 | 2.83 | 30 |
| 5.68 | 10 | 2.805 | 20 |
| 5.34 | 10 | 2.67 | 10 |
| 4.56 | 10 | 2.59 | 5 |
| 4.31 | 40 | 2.49 | 10 |
| 4.15 | 20 | 2.47 | 10 |
| 3.80 | 20 | 2.20 | 5 |
| 3.74 | 40 | 2.11 | 5 |
| 3.58 | 30 | 1.88 | 5 |
| 3.30 | 10 | 1.83 | 5 |
| 3.27 | 10 | 1.77 | 10 |
| 3.20 | 10 | 1.65 | 10 |
| 3.16 | 10 | | |

Other examples of synthetic crystalline zeolitic molecular sieves which may be reactivated by the process of the present invention are: Zeolite L, described and claimed in U.S. patent application Serial No. 711,565 filed January 28, 1958, now abandoned and zeolite Y, described and claimed in U.S. patent applications Serial No. 728,057 filed April 14, 1958, now abandoned and Serial No. 862,062 filed December 28, 1959, now abandoned.

Other examples of natural crystalline zeolitic molecular sieves which may be reactivated by the process of this invention are chabazite, faujasite and mordenite.

The crystalline molecular sieves zeolite A, zeolite X, zeolite Y and erionite have been found particularly useful in the process of the present invention.

Crystalline zeolitic molecular sieves may be used in a wide variety of processes involving the separation of carbon-containing compounds from mixtures with other compounds. For example, normal paraffins may be separated from mixtures with other hydrocarbons because the normal paraffins are preferentially adsorbed within the pores of certain molecular sieves. In other processes, olefins may be recovered from refinery gas streams, acetylenic compounds may be removed from olefins, and sulfur-, oxygen-, and nitrogen-containing organic compounds may be separated from hydrocarbon compounds.

In many processes utilizing crystalline zeolite molecular sieves, carbonaceous material which is nonvolatile at the operating conditions for either adsorption or desorption is deposited on the surface and within the pores of the molecular sieve. The deposit of nonvolatile carbonaceous matter may result, for example, from polymerization of unsaturated compounds, from isomerization, or from thermal decomposition of any carbon-containing compound which come in contact with the molecular sieves.

This carbonaceous matter which is nonvolatile at the operating temperature will be referred to hereinafter as coke. The deposition of coke results in a reduction in the adsorption capacity of the molecular sieve. Consequently, the molecular sieve must be reactivated by removal of the coke deposits.

The reactivation of a molecular sieve by removal of coke deposits must be carried out in such a manner that high selective adsorptive capacity of the sieve is retained and no substantial damage is done to the crystal structure of the sieve. The adsorptive capacity must be retained not only on the surface of the molecular sieve crystals but also throughout the entire pore volume of the crystals. Further, the selective adsorption properties of crystalline zeolitic molecular sieves depend on the uniformity of the pores in the crystal lattice. Therefore any substantial damage to the essential crystal structure destroys the selective properties of the sieve.

Crystalline zeolitic molecular sieves may also be loaded, within the pores of the crystal structure, with a variety of metals such as zinc, platinum and palladium. The reactivation process of the present invention also applies to such metal loaded molecular sieves when the metal itself is inert to oxygen at burnoff temperature. For example, the adsorption capacity and catalytic activity of platinum loaded zeolite Y may be reactivated by the coke burnoff process described hereinbelow.

The several species of crystalline zeolitic molecular sieves described hereinabove may be continuously maintained in an inert atmosphere and at temperatures up to about 1290° F. without substantial damage to the crystal structure. At temperatures above about 1325° F., the essential crystal structure of these sieves is rapidly and almost completely destroyed.

The crystal structure of these molecular sieves may also be substantially damaged at temperatures below about 1290° F. by contact with an atmosphere containing appreciable quantities of water vapor. Therefore the water vapor concentration in contact with the molecular sieve during reactivation must be carefully controlled.

It is an object of this invention to provide a process for reactivating crystalline zeolitic molecular sieves.

It is a further object of this invention to provide a process for removing nonvolatile carbonaceous matter from crystalline zeolitic molecular sieves without substantial damage to the crystal lattice of the sieve crystals.

A still further object of the invention is to provide a process for maintaining the adsorption capacity of crystalline zeolitic molecular sieves by periodic removal of coke deposits from such sieves.

Another object of the invention is to provide a process for maintaining the adsorption capacity and catalytic activity of metal loaded crystalline zeolitic molecular sieves when the metal is inert to oxygen at process temperatures.

Other objects of the invention will be apparent from the description of the invention and the appended claims.

In the drawings: FIGS. 1-4 are schematic diagrams illustrating the general characteristics of the reactivation process of this invention. FIG. 1 shows the burning zone 14, heat storage zone 16 and gas preheating zone 15 for a molecular sieve bed 10 during reactivation. FIG. 2 is a plot of the temperature profile of the bed 10 showing the relative temperatures in the various zones, FIG. 3 shows the relative coke loading in the various zones, and FIG. 4 shows the relative oxygen concentrations in the various zones, all plotted as a function of the distance along the bed 10.

FIG. 5 is a graph illustrating the effect of water vapor on the adsorption capacity of crystalline zeolitic molecular sieves.

The coke deposits which must be removed from molecular sieves contain primarily carbon and hydrogen. The ratio of hydrogen atoms to carbon atoms in the coke is frequently as high as about 2 to 1. In addition, the coke may contain nitrogen, sulfur, and other elements which are found in organic chemical compounds. In particular, cokes containing appreciable amounts of sulfur may be removed by the process of this invention.

The general characteristics of the reactivation process of this invention are described with the aid of FIGS. 1-4. A bed of crystalline zeolitic molecular sieve on which coke has deposited, represented by the elongated rectangle 10 in FIG. 1 having inlet end 11 and outlet end 12, is initially heated to a temperature above the ignition temperature of the coke.

The apparent ignition temperature of an element or compound, whether solid, liquid or gaseous, is the temperature required to initiate or cause oxidation sufficiently rapid to be self-sustained when the heating or heated element is removed. In the process of this invention a convenient indication of whether a bed of coked molecular sieve is at or above its ignition temperature is whether or not substantially all of the oxygen introduced is consumed in passing through the bed, provided of course that sufficient coke is present to react with the oxygen. That is, if substantially all of such oxygen is consumed on passage through the bed, the ignition temperature has been reached. The bed in the usual case is sufficiently large so that the reactivation process may be considered as adiabatic.

A gas containing between about 20 mol percent and about 100 mol percent oxygen is provided and contacted with the nonvolatile carbonaceous matter containing zeolitic molecular sieve at a combustion temperature which is at least the ignition temperature of the carbonaceous matter and below the value expressed by the following formula:

$$T = 1150 - W(520 + 140 h/c) \quad (1)$$

where $T$ = temperature of the heater zeolitic molecular sieve in °F.
$W$ = loading of the nonvolatile carbonaceous matter on the sieve in lbs. per 100 lbs. of activated sieve.
$h/c$ = atomic ratio of hydrogen to carbon in nonvolatile carbonaceous matter.

The oxygen concentration is maintained above about 20 mol percent so that the rate of travel of the burning zone will be faster than the rate of travel of the gas preheating (or solids cooling) zone with the result that the temperature rise will be substantially only from the combustion heat with only a minor contribution from heat carried forward by the gas.

The temperature will not rise above the safe upper limit of 1150° F. when the initial coke loading is less than 1.2 wt. percent and the initial temperature is set according to the formula above.

The essence of the present invention lies in the discovery that when the amount of coke to be burned off is below about 1.2 lbs. per 100 lbs. actuated sieve, a high oxygen content burnoff gas may be employed, that is, a gas containing between about 20 mol percent and 100 mol percent of oxygen. This provides burning zone 14 with a linear velocity which is greater than the velocity of transport of heat by the gas stream, thereby avoiding the excessive temperatures which could damage the molecular sieve crystal structure. Under these conditions, the combustion of the coke is largely confined to the fast-moving burning zone 14. Heat generated by the combustion is left in the molecular sieve as the burning zone 14 moves on through the bed. The heated molecular sieve constitutes the heat storage zone 16, which lies behind the burning zone 14. The relatively cool, oxygen-bearing feed gas cools the hot molecular sieve in heat storage zone 16, and is itself heated by the sieve. The cooling of the molecular sieve and the heating of the feed gas are largely confined to the gas-preheat zone (solids cooling zone) 15. The net result is a relatively fast moving burning zone separated from a less rapidly moving gas preheat (solids cooling) zone 15 by a linearly expanding region 16 of constant temperature heat storage. In this manner, an extremely fast burnoff can be effected that is limited only by the heat developed during combustion of the coke associated with a given particle or pellet of molecular sieve. The maximum bed temperature occurs in the heat storage zone 16, where substantially all of the heat produced by combustion is stored.

It has been determined that the temperature rise of a molecular sieve zeolite in degrees Fahrenheit is about 660 times the weight in grams of coke burned off per 100 grams of zeolite when the coke has a hydrogen-to-carbon ratio of 1. At a hydrogen-to-carbon ratio of 2, the factor is about 800. Therefore if a molecular sieve zeolite bed has a coke loading of 0.8 weight percent with an $h/c$ of 2 and an ignition temperature of 400° F., a temperature rise of $(800 \times 0.8) = 640$ will give a peak temperature of 1040° F., which is well below the upper limit of 1150° F. The above figures are based on the total combustion of the coke. Since it has been found that when calcium ion-exchanged zeolite A is employed, approximately 0.2 wt.-percent coke remains after the most rigorous burnoff. This means that the initial coke content would be 1% if the example were applied to this particular molecular sieve zeolite.

Substantially all of the oxygen in the gas stream is consumed in the burning zone 14. At the same time the coke loading is reduced from the initial value. The linear velocity of the burning zone thus depends primarily on the gas feed rate, the oxygen concentration in the feed gas, and the amount by which the coke loading is reduced. For any given gas feed rate, the linear velocity of the burning zone is high when the oxygen concentration is high and the reduction in coke loading is low. Under these circumstances, the burning zone 14 moves through the bed more rapidly than the gas-preheat zone 15.

As the burning zone moves through the bed, the temperature of the molecular sieve rises from the initial bed temperature to the maximum bed temperature, which prevails in the heat storage zone 16. The temperature rise accompanies the deposition of heat in the molecular sieve. Most of the heat is generated within the molecular sieve by combustion of the coke. A small amount of the heat comes from the hot oxygen-containing gas stream, which flows into the burning zone 14 from the heat storage zone 16. The temperature rise which occurs in the burning zone 14 is large if a high concentration of coke is burned off, producing a high concentration of heat in the molecular sieve. The temperature rise in the burning zone is also large if excessive quantities of diluent material, such as nitrogen, helium, etc., are present in the gas stream to carry large amounts of heat from the gas-preheat zone 15, through the heat storage zone 16, into the burning zone 14.

The upper limit on the magnitude of the temperature rise that can be tolerated in the burning zone is fixed by the ignition temperature of the coke. Before this rise occurs, the molecular sieve temperature must be at least as high as the ignition temperature. After the rise occurs, the molecular sieve temperature must be no higher than about 1150° F. The magnitude of the temperature rise must therefore be no greater than the difference between 1150° F. and the ignition temperature of the coke.

In the gas preheating zone 15 the gas and solids temperatures will essentially coincide at both the leading and trailing edges of the zone. Since both gas and solids are thus subjected to essentially the same temperature change, the linear velocity of this zone will be independent of the absolute temperature change and will vary directly with the gas flow rate (neglecting changes with temperature in the ratio of the heat capacities of the gas and solids which may alter the velocity slightly). The inlet temperature 24 and outlet temperature 26 are not necessarily equal, but vary depending upon the particular process conditions.

To obtain the previously discussed elevated temperatures in the coke-loaded zeolitic molecular sieve bed, the latter may be preheated by, for example, embedded coils to at least the ignition temperature of the deposit but not above a temperature defined by Formula 1. The ignition temperature varies with the nature and composition of the particular coke, but a temperature of at least 600° F. has been found preferable. This preheating step is particularly desirable when the hydrogen to carbon ratio in the coke is greater than about one. The heat of combustion of the coke increases with its hydrogen content. The preheating treatment generally reduces the hydrogen content of the coke by driving off gases and vapors such as hydrogen, and the hydrogen-rich materials methane, ethane, isobutene and the like. The preheating also tends to stabilize the coke by promoting the formation of condensed aromatic rings. These condensed ring systems burn more evenly than randomly arranged carbon chains and the heat produced in the burnoff process is therefore more evenly distributed.

The desired reduction in hydrogen to carbon ratio and stabilization of the coke may also be obtained by longer preheating times at lower temperatures. In some processes, for example, it may be convenient to preheat the coke at about 500° F. for 24 hours. The preheating of the coke may also be carried out by starting at lower temperature and gradually increasing the temperature to the combustion level. When the coked bed has been preheated, the oxygen-containing gas is admitted and a rapidly advancing burning zone 14 moves through the bed.

The burnoff feed gas itself is preferably preheated to a temperature below 1150° F. although this is not essential to the invention. If the burnoff feed gas is preheated to some temperature close to but below 1150° F. before entering the regeneration chamber, the main effect will be that no solids cooling zone will be developed. Since the burnoff zone 14 travels faster than the gas preheating zone and since the initial temperature has been set with regard to the coke to be combusted so that the pellet temperature will not exceed about 1150° F., the feed gas will arrive at the burnoff zone near the maximum temperature in the heat storage zone 15, once the burning zone and the gas preheating zone have moved apart. During the period when the two zones are separating from each other, the temperature of the gas entering the burning zone 14 will rise from the feed temperature to the maximum temperature which is developed in the heat storage zone 16 when the two zones have fully separated. When the feed gas is relatively cold (below the ignition temperature) the separation of the two zones takes longer and the temperature of the gas entering the burning zone takes longer to rise. As a result, the oxidation of the deposit situated near the bed entrance is likely to be less complete.

In some situations, the advantages of employing a cold gas feed may outweigh the disadvantage of the incomplete oxidation. For example, the economic advantages resulting from the savings in time and heat input may outweigh the disadvantages of impaired performance due to residual coke. In most cases, however, it is preferred that the feed be supplied at above the ignition temperature at least until the burning zone 14 has moved into the bed and essentially all of the coke deposit situated near the bed entrance or inlet has been burned. At this point the feed gas temperature may, if desired, be reduced to any desired level. Preferably the feed gas can be adjusted to a first temperature at which the particular zeolite bed is to operate after reactivation and no further temperature adjustment is needed after reactivation is complete. That is, the degree of preheating may be reduced sufficiently so that the oxygen-containing gas is at essentially the same temperature as the hydrocarbon-containing feed gas from whence the nonvolatile carbonaceous material is deposited.

The oxygen-containing burnoff gas is preferably purged from the crystalline zeolitic molecular sieve bed before the bed is returned to hydrocarbon processing service. This purge gas can for example be a relatively inert fluid such as nitrogen, carbon dioxide or helium. The purge flow may be initiated any time after the coke has been burned, and need not be delayed until the bed temperature has been adjusted. A convenient indication that substantially all of the coke has been burned, which is to say that the burning zone has passed the exit end of the bed, is that the oxygen content of the effluent is nearly the same as in the feed gas.

When the crystalline zeolitic molecular sieve bed contains more than about 1.2 percent by weight nonvolatile carbonaceous matter plus volatile combustible compounds, it is preferable to free the sieve of such volatile compounds and effect a stabilization of the carbonaceous material before the burnoff step is initiated. This is because the burning zone is not preceded by a heat storage zone or solids preheat and purge zone, and consequently little or no prepurging or cracking occurs ahead of the burning zone. In some instances, the process in which the coke was developed on the zeolitic molecular sieve may have effected removal of such volatiles, particularly if the process involved elevated temperatures and low pressure or high vacuum. The coke may, on the other hand, have been deposited at lower temperatures and could yield considerable combustible, volatile material upon heat-up. One such process is that wherein a molecular sieve zeolite is employed to selectively remove unsaturated olefins, diolefins or acetylenic compounds from less unsaturated hydrocarbons. In such instances, it is necessary to effect preheat and purge or evacuation to stabilize the coke before conducting the oxygen burnoff of the present invention.

A preferred method for stabilizing the coke is to continuously purge the bed with a nonadsorbable and relatively inert gas such as nitrogen methane,, carbon monoxide or carbon dioxide while simultaneously raising the temperature to the range of 700° F. to 1150° F., preferably 850°–1000° F. A highly efficient method of warmup is by heating the purge gas and thereby heating the bed.

The burnoff feed gas may be any oxygen-containing gas mixture having at least about 20 mol percent oxygen since gases having lower oxygen concentrations tend to produce excessive temperatures unless the oxygen concentration is extremely low, below about 1 mol percent. Air, oxygen-enriched air or 95%–99.9% oxygen such as obtained by the well-known methods of rectifying air, may be used. Diluents other than nitrogen may be employed, for example carbon dioxide or the rare gases exemplified by argon and helium. Air is the most convenient and will be the most economical source of oxygen in most instances. However there are advantages in using higher oxygen content gas, such as improved removal of the last 0.1 to 0.2 weight percent coke and a slightly lower ignition temperature. In certain processes, particularly where coke is to be removed to reactivate a zeolitic molecular sieve containing a fixed catalyst, the lowered final coke content is required. In other processes, the construction materials of the chamber housing the zeolitic molecular sieve should not be exposed to the 1150° F. upper safe temperature of the zeolite. In this event, a feed gas having a higher oxygen concentration than 20% is preferred so that a lower combustion temperature may be employed.

The temperatures in the present reactivation process are not pressure dependent since the temperature rise is regulated by the weight percent loading of coke in the zeolitic molecular sieve bed. Any pressure may be employed which is suitable for the equipment in which the zeolite is contained. Reactivation pressures from about 1 to 10 atmospheres are considered to be most practical from the standpoint of economics, while a range of 1 to 3 atmospheres is preferred in order to lessen the moisture damage to the zeolitic molecular sieve.

The water vapor concentration in contact with the molecular sieve must also be controlled to prevent damage to the sieve at the maximum temperatures encountered in the heat storage zone. The maximum level of water vapor that can be tolerated in the influent gas depends upon the temperature in the bed, the total time for which the bed is exposed to the water vapor and the amount of loss in adsorptive capacity which can be tolerated in the particular process. The time of exposure depends on the number of burnoffs to be carried out and the time required for each of these factors may vary widely depending upon the particular process employing the crystalline zeolitic molecular sieve adsorbent. For example, some hydrocarbon separation processes required burnoffs as infrequently as once in six months. The amount of decrease in adsorptive capacity which can be tolerated may vary from about 10 percent up to about 15 percent.

FIGURE 5 shows the effect on the equilibrium capacity of calcium zeolite A when exposed to water vapor under varying conditions of water vapor partial pressure, exposure time and temperature. The solid curve of FIGURE 5 represents an exposure time of 120 hours to water vapor at 3.5 p.s.i.a. As the exposure temperature increases the percent loss in equilibrium capacity also increases. The loss for n-hexane adsorption capacity is about 3 percent at 750° F., about 6 percent at 925 F. and about 10 percent at 1150° F. For a slightly higher water vapor concentration of about 4 p.s.i.a., the loss in equilibrium capacity approaches the maximum amount which can be tolerated in most processes.

The dotted line in FIGURE 5 is for a water vapor concentration of 0.15 p.s.i.a. and an exposure time of 1000 hours. Under these conditions the loss in equilibrium capacity is about 1 percent at 750° F., about 2 percent at 925° F. and about 3.5 percent at 1150° F.

Exposure of calcium zeolite A pellets to water vapor at 14.7 p.s.i.a. for only 20 hours resulted in about a 20 percent loss in equilibrium adsorption capacity at 925° F. Thus the maximum allowable water vapor concentration in the inlet gas is about four pounds per square inch absolute (p.s.i.a.) and it is preferable to have the water vapor concentration in the gas below about 0.15 p.s.i.a.

The amount of water vapor in the gas entering at the inlet of the molecular sieve bed may be controlled by providing drying apparatus for the insert gas (or inert gas-oxygen mixture) employed in the process. Conventional gas drying equipment may be used for this purpose.

At the start of the burnoff step, the oxygen concentration in the gas is controlled so that the temperature in the burning and heat storage zones does not rise above that defined by the previously discussed Formula 1. This formula determines the maximum temperature to which a bed of coked molecular sieve may be preheated before the oxygen containing feed gas is admitted to effect combustion of the coke. In this formula where $$T = 1150 - W(520 + 140h/c)$$

T is the maximum bed preheat temperature in ° F., and 1150 is the upper safe limit in ° F. to which the bed may be permitted to rise without excessive damage to the essential crystalline characteristics of the molecular sieve. The expression $W(520+140h/c)$ provides for the temperature rise of the molecular sieve resulting from combustion of a given weight of coke per hundred weight of the molecular sieve expressed as W, adjusted for the heat of combustion as it varies for coke having a known ratio of hydrogen to carbon in the range of 0 to 2.

Although the crystalline zeolitic molecular sieves described hereinabove may be maintained at temperatures up to 1290° F. without substantial damage to their crystal structures, the maximum permissible temperature during the burnoff step is about 1150° F. This is because the 1150° F. temperature is measured by thermocouples or other devices which record the average or bulk temperature in a particular area of the molecular sieve bed. There are, however, portions of the individual molecular sieve crystals which may attain higher transient temperatures during burnoff. This is particularly true of areas where the burning of the coke is actually taking place. By maintaining the bed temperature below about 1150° F., damaging transient temperatures above about 1290° F. are almost entirely avoided.

To obtain reasonably low burnoff times, the flow rate of the oxygen-containing feed gas should be at least about 5 pounds of air or 1 pound of oxygen per hour per square foot of bed cross section. However flow rates provide faster burnoff and these rates may even exceed fluidization velocities if downflow is employed or if the crystalline zeolitic molecular sieve bed is sufficiently confined to reduce attrition damage. The higher flow rates are also beneficial in that the residence time of the bed at elevated temperature is shortened and thereby the water vapor damage which is time-dependent is reduced. The oxygen-containing feed gas flow rate is preferably less than about 5,000 pounds of gas per hour per square foot as higher rates involve prohibitive compression costs of the feed gas to overcome the pressure drop through the bed.

The present invention is illustrated in detail by the following examples:

Example I

A bed of calcium ion-exchanged zeolite A pellets having a coke deposit of 0.9 lb. per 100 lbs. activated sieve is to be regenerated. The $h/c$ ratio is 1.2. Such a coke loading results from the use of molecular sieves in hydrocarbon separation processes operating in elevated temperature service. The ignition temperature is about 600° F. Since the molecular sieve involved here is calcium ion-exchanged zeolite A, experiments have shown that 0.2 lb. coke per 100 lb. activated sieve will not burn off, so that only about 0.7 lb. coke per 100 lbs. activated sieve is available for combustion. The initial bed temperature must be at least as great as 600° F., the ignition temperature, and must be no greater than T, where $$T = 1150 - W(520 + 140h/c)$$

$$W = 0.9 - 0.2 = 0.7$$

$$h/c = 1.2$$

Therefore, $$T = 1150 - 0.7[520 + 140(1.2)]$$

$$T = 669° F.$$

The initial bed temperature must be greater than 600° F. and must be less than 669° F.

The bed is heated to about 630° F. in an atmosphere of nitrogen gas. Then air is passed through the bed at a mass velocity of 1100 lbs. air per hour per square foot of bed cross sectional area. The air is fed into the bed at 1000° F. When the temperature of the gas leaving the bed has reached 900° F., the feed air heaters are shut off, allowing cool air at 100° F. to enter the bed. When the bed has cooled, a purge of nitrogen is passed down through the bed to sweep out oxygen. The regenerated molecular sieve is then ready for return to hydrocarbon separation service.

Example II

A bed of calcium ion-exchanged zeolite A pellets having a uniform coke deposit of 2.1 lbs. per 100 lbs. activated sieve is to be regenerated. The $h/c$ ratio is 2.0. The deposit is known to contain material that can be removed from the zeolite by a gas purge at 1000° F. with the coke loading being thereby reduced to about 0.8 lb. per 100 lbs. activated sieve and with the $h/c$ ratio being thereby reduced to 0.9. The ignition temperature of the final deposit is about 670° F.

Since the molecular sieve involved here is calcium ion-exchanged zeolite A, 0.2 lb. coke per 100 lbs. activated sieve will not burn off, so that only 0.6 lb. coke per 100 lbs. activated sieve is available for combustion. Before the burnoff begins, the bed temperature must be at least as great as 670° F., and must be no greater than T, where $$T = 1150 - W(520 + 140h/c)$$
$$W = 0.8 - 0.2 = 0.6$$
$$h/c = 0.9$$
$$T = 1150 - 0.6[520 + 140(0.9)]$$
$$T = 762° \text{ F.}$$

The temperature just before burnoff must be at least as great as 670° F. and must be no greater than 762° F.

The bed is heated to 1000° F. in a flow of methane, and is then cooled to about 700° F. After the bed is cooled to 700° F., it is purged with nitrogen gas to remove the methane. Then air is passed through the bed at a mass velocity of 500 lbs. air per hour per square foot of bed cross sectional area. The air is fed into the bed at 950° F. When the gas leaving the bed contains 15 mol percent oxygen, the feed air heaters are shut off, allowing cool air, at 100° F., to enter the bed. When the bed has cooled, a purge of nitrogen is passed down through the bed to sweep out oxygen and the reactivated molecular sieve is ready for return to its intended service.

Although the preferred embodiments have been described in detail, it is contemplated that modifications of the method may be made and that some features may be employed without others, all within the spirit and scope of the invention as set forth herein.

This is a continuation-in-part application of U.S. Serial No. 824,643 filed July 2, 1959, in the name of R. L. Mays et al.

What is claimed is:

1. A process for reactivating a crystalline zeolitic molecular sieve by oxidative removal of nonvolatile carbonaceous matter therefrom, the crystal structure of said molecular sieve being stable at temperatures up to about 1290° F., which process comprises: providing a gas containing between about 20 mol percent and about 100 mol percent oxygen and a water vapor concentration less than about 4 p.s.i.a. and initially contacting said gas with zeolitic molecular sieve containing less than about 1.2% by weight of nonvolatile carbonaceous matter at a flow rate of at least 1 pound of oxygen per hour per square foot of molecular sieve bed cross section, and at a combustion temperature which is at least the ignition temperature of said carbonaceous matter and below the value expressed by the following formula to burn such matter:

$$T = 1150 - W(520 + 140h/c)$$

where $T$ = temperature of the heated zeolitic molecular sieve in ° F.
$W$ = loading of the nonvolatile carbonaceous matter on the sieve in lbs. per 100 lbs. of activated sieve
$h/c$ = atomic ratio of hydrogen to carbon in the nonvolatile carbonaceous matter the oxygen concentration being controlled to maintain the temperature of the molecular sieve below about 1150° F., and said contacting being continued sufficiently long to remove at least most of said nonvolatile carbonaceous matter.

2. A process according to claim 1 in which the crystalline zeolitic molecular sieve is preheated to said combustion temperature before contact with the oxygen-containing gas.

3. A process according to claim 1 in which the oxygen-containing gas is preheated to said combustion temperature before contact with the crystalline zeolitic molecular sieve.

4. A process according to claim 1 in which the crystalline zeolitic molecular sieve also contains volatile combustible compounds, and the molecular sieve is sufficiently preheated before burning of said nonvolatile carbonaceous matter for removal of said volatile combustible compounds.

5. A process according to claim 1 in which the crystalline zeolitic molecular sieve also contains volatile combustible compounds, and a purge gas is provided and contacted with crystalline zeolitic molecular sieve before burning of said nonvolatile carbonaceous matter for removal of said volatile combustible compounds.

6. A process according to claim 1 in which air constitutes the oxygen-containing gas employed to burn said nonvolatile carbonaceous matter.

7. A process according to claim 1 in which the water vapor concentration of the oxygen-containing gas is maintained below about 0.15 p.s.i.a.

8. A process according to claim 1 in which said crystalline deolitic molecular sieve is selected from the group consisting of zeolite A, zeolite X, zeolite Y and erionite.

9. A process according to claim 1 in which the oxygen-containing gas is contacted with the zeolitic molecular sieve at a rate less than about 5,000 pounds per hour per square foot of molecular sieve material.

10. A process according to claim 1 in which the zeolitic molecular sieve is provided with an inlet end and a discharge end, and the oxygen-containing gas is preheated to said combustion temperature and introduced at said inlet end, the preheating being continued at least until substantially all of said nonvolatile carbonaceous matter deposited contiguously to said inlet end has been burned.

11. A process according to claim 10 in which said oxygen-containing gas is contacted with the zeolitic molecular sieve at a first temperature below said combustion temperature after burning substantially all of said nonvolatile carbonaceous matter deposited contiguously to said inlet end, and a hydrocarbon-containing feed gas is thereafter contacted with the zeolitic molecular sieve at said first temperature after removal of the nonvolatile carbonaceous matter deposited in the remainder of the molecular sieve.

References Cited in the file of this patent
UNITED STATES PATENTS

| | | |
|---|---|---|
| 2,162,893 | Kuhl | June 20, 1939 |
| 2,246,950 | Peck | June 24, 1941 |
| 2,908,639 | Carter et al. | Oct. 13, 1959 |